Patented Apr. 29, 1924.

1,492,404

UNITED STATES PATENT OFFICE.

JOHN E. SMITH, OF PHILADELPHIA, PENNSYLVANIA, ASSIGNOR TO THOMSON WOOD FINISHING COMPANY, OF PHILADELPHIA, PENNSYLVANIA, A CORPORATION OF PENNSYLVANIA.

REFINISHING COMPOSITION.

No Drawing. Application filed May 12, 1922. Serial No. 560,458.

*To all whom it may concern:*

Be it known that I, JOHN E. SMITH, a citizen of the United States, residing in Philadelphia, Pennsylvania, have invented Refinishing Compositions, of which the following is a specification.

One object of this invention is to provide a liquid composition particularly designed for preparing for refinishing, varnished or painted surfaces which have "alligatored," cracked or crazed, without removing the original paint or varnish, and the invention more especially contemplates a liquid mixture which in addition to slightly softening and bonding with the varnish surface to which it is applied, shall cause the various portions or areas into which this material has separated to more or less coalesce and be filled so as to provide or form a smooth surface to which finishing materials may be applied.

In carrying out my invention, in a typical case I mix together twenty-five parts by volume of ethyl alcohol, five parts of methyl alcohol, fifteen parts of benzol, twelve parts of a suitable resinous material such as spirit-soluble Manila or other copal gum, and one part of acetone. If desired, I may in addition mix with the above noted liquid a small quantity of oil of citronella or other material to give it a pleasing odor.

The above liquid mixture, when applied in one or any required number of coats to a varnished or painted surface which requires refinishing because of crazing, softens the same, causing such crazing to be wholly or partially obliterated. The volatile ingredients of the composition will thereafter evaporate so that the treated surface will dry hard, in which condition it is ready for sanding and finishing and for this purpose one or more coats of any suitable varnish or other finishing material may be applied in the well understood manner. In place of copal gums I may use other resinous material, including shellac or synthetic resins.

While the proportions of the ingredients above named may be varied to some extent without departing from my invention, it is essential that the composition possess the quality first of slightly softening the body of paint or varnish to which it is applied and then filling, either partially or wholly, the cracks therein to form a uniformly smooth surface and second, it must possess the ability of thoroughly drying so as to leave the surface to which it has been applied in a hard dry condition in order that it may be subsequently finished within a reasonable time.

From the above description it will be appreciated that by the use of my invention there is no necessity for removing the paint or varnish on the surface which is to be refinished, so that I am enabled to save the labor hitherto required for this work and after the application of my composition such surface may be finally finished by the use of ordinary varnishes or paints.

I claim:

1. A composition for treating cracked finished surfaces comprising a mixture of ethyl and methyl alcohols, benzol, a soluble resinous material and acetone, in the proportions necessary to soften and fill a cracked finished surface to which it is applied.

2. A composition for treating cracked finished surfaces comprising thirty parts of alcohol, fifteen parts of benzol, twelve parts of resinous material, and one part of acetone.

JOHN E. SMITH.